(12) United States Patent
Limingoja

(10) Patent No.: US 6,176,519 B1
(45) Date of Patent: Jan. 23, 2001

(54) METHOD AND DEVICE FOR FORCED STOPPING OF A VEHICLE

(76) Inventor: Markku Limingoja, Sellerite 5, Oulunsalo (FI), FIN-90460

( * ) Notice: Under 35 U.S.C. 154(b), the term of this patent shall be extended for 0 days.

(21) Appl. No.: 09/180,589

(22) PCT Filed: May 26, 1997

(86) PCT No.: PCT/FI97/00314

§ 371 Date: Nov. 12, 1998

§ 102(e) Date: Nov. 12, 1998

(87) PCT Pub. No.: WO97/45303

PCT Pub. Date: Dec. 4, 1997

(30) Foreign Application Priority Data

May 27, 1996 (FI) ....................................... 962209

(51) Int. Cl.⁷ .................................................. B60R 0/00
(52) U.S. Cl. .......................................... 280/762; 180/287
(58) Field of Search ................................... 280/481, 598, 280/502, 762, 479.1, 491.5, 508, 727; 180/287; 173/90, 212; 169/70, 62; 414/24.5, 378, 444; 43/6, 132.1; 30/1; 294/1.1, 61, 126

(56) References Cited

U.S. PATENT DOCUMENTS

| | | | | |
|---|---|---|---|---|
| 3,981,517 | * | 9/1976 | Crochet, Sr. ....................... | 280/478 R |
| 4,422,818 | * | 12/1983 | Molby ................................ | 414/712 |
| 4,798,143 | * | 1/1989 | Graham ............................. | 102/370 |
| 4,839,985 | * | 6/1989 | Barry ................................. | 43/132.1 |
| 5,067,237 | * | 11/1991 | Holder .............................. | 30/1 |
| 5,301,756 | * | 4/1994 | Relyea et al. ..................... | 169/24 |
| 5,333,881 | * | 8/1994 | Cugliari ............................ | 273/416 |
| 5,480,108 | * | 1/1996 | Amiand et al. ................... | 244/115 |
| 5,540,284 | * | 7/1996 | Esposito et al. ................. | 169/62 |
| 5,564,359 | * | 10/1996 | Harder ............................. | 116/28 R |
| 5,611,408 | * | 3/1997 | Abukhader ...................... | 180/287 |
| 5,651,653 | * | 7/1997 | Bablo ............................... | 414/24.5 |
| 5,839,759 | * | 11/1998 | Trigo ................................ | 280/762 |

FOREIGN PATENT DOCUMENTS

| 2110749C1 | * | 5/1998 | (RU) . |
|---|---|---|---|
| 503347 | | 5/1996 | (SE) . |

* cited by examiner

Primary Examiner—Paul N. Dickson
Assistant Examiner—Daniel Yeagley
(74) Attorney, Agent, or Firm—Merchant & Gould P.C.

(57) ABSTRACT

A method for forced stopping of a second vehicle (B) by using a first vehicle (A) includes equipment (C) in the front end of the first vehicle (A) which can be used to engage sheet metal structures, and the front end of the first vehicle (A) is driven into the rear of the second vehicle (B) so that the equipment (C) in the front end of the first vehicle engages the sheet metal structure in the rear of the second vehicle (B), whereby the second vehicle (B) can be stopped by the first vehicle (A). The equipment (C) used can include a turning body part and a tip part with gripping device attached to the body part in a detachable way. The gripping device can contain a tip which penetrates the sheet metal structure. The method and the equipment according to the invention can be used to stop a fleeing vehicle without the need to drive beside it or to pass it or to try to force it off the road.

11 Claims, 2 Drawing Sheets

METHOD AND DEVICE FOR FORCED STOPPING OF A VEHICLE

BACKGROUND OF THE INVENTION

The invention is related to stopping vehicles by force.

The police often find themselves in situations where a fleeing vehicle must be stopped by force by a chasing vehicle. One known method is to try to shoot the tires of the fleeing vehicle in order to reduce the control of the vehicle and its ability to flee. Another known method is to force the fleeing vehicle to stop by driving the chasing vehicle to the side or in front of it or, in suitable road conditions, to push the fleeing vehicle from the back corner so that its driver looses control of the vehicle and the vehicle goes off the road. When any of these means are used, the chasing vehicle must go beside or past the fleeing vehicle, and both the chasing and the fleeing party commit themselves to serious danger. The fleeing vehicle as well as the chasing vehicle also often suffer serious damage.

SUMMARY OF THE INVENTION

The purpose of the invention is to provide an entirely new method and the equipment for stopping vehicles by force, which can be used to avoid the above-mentioned disadvantages and risks to a large extent.

Stopping by force by using the method and the equipment according to the invention is carried out so that the gripping means of the stopping equipment attached to the front end of the chasing vehicle are driven into the rear sheet metal structure of the vehicle to be stopped so that a fixed contact is provided between the cars. In one preferred embodiment, the gripping means contain a tip which penetrates the sheet metal structure. After this, depending on the speed and the conditions, the chasing car is slowed down so that the fleeing vehicle stops. When this method is used, it is not necessary to pass the fleeing vehicle, which is dangerous because of the cutting in and the oncoming traffic. Neither is it necessary to shoot at the vehicle, which is always dangerous for both parties as well as bystanders. Furthermore, burst tires do not always stop the vehicle. Neither is it necessary to stop the fleeing vehicle by placing obstacles on the road.

The forced stopping equipment can be used by one car and its driver. It is ready installed in the front of the car and it can be activated from its rest position from the driver's compartment of the car when the car is moving. The equipment can be implemented so that gas can be injected into the fleeing vehicle. If, for some reason, the contact between the vehicles must be undone, part of the equipment remains in the fleeing vehicle and in one possible embodiment, tracer gas begins to release from it to facilitate following.

BRIEF DESCRIPTION OF THE DRAWING

In the following, the invention is now described in detail with reference to the attached drawings in which.

DETAILED DESCRIPTION OF THE INVENTION

Figure 1:
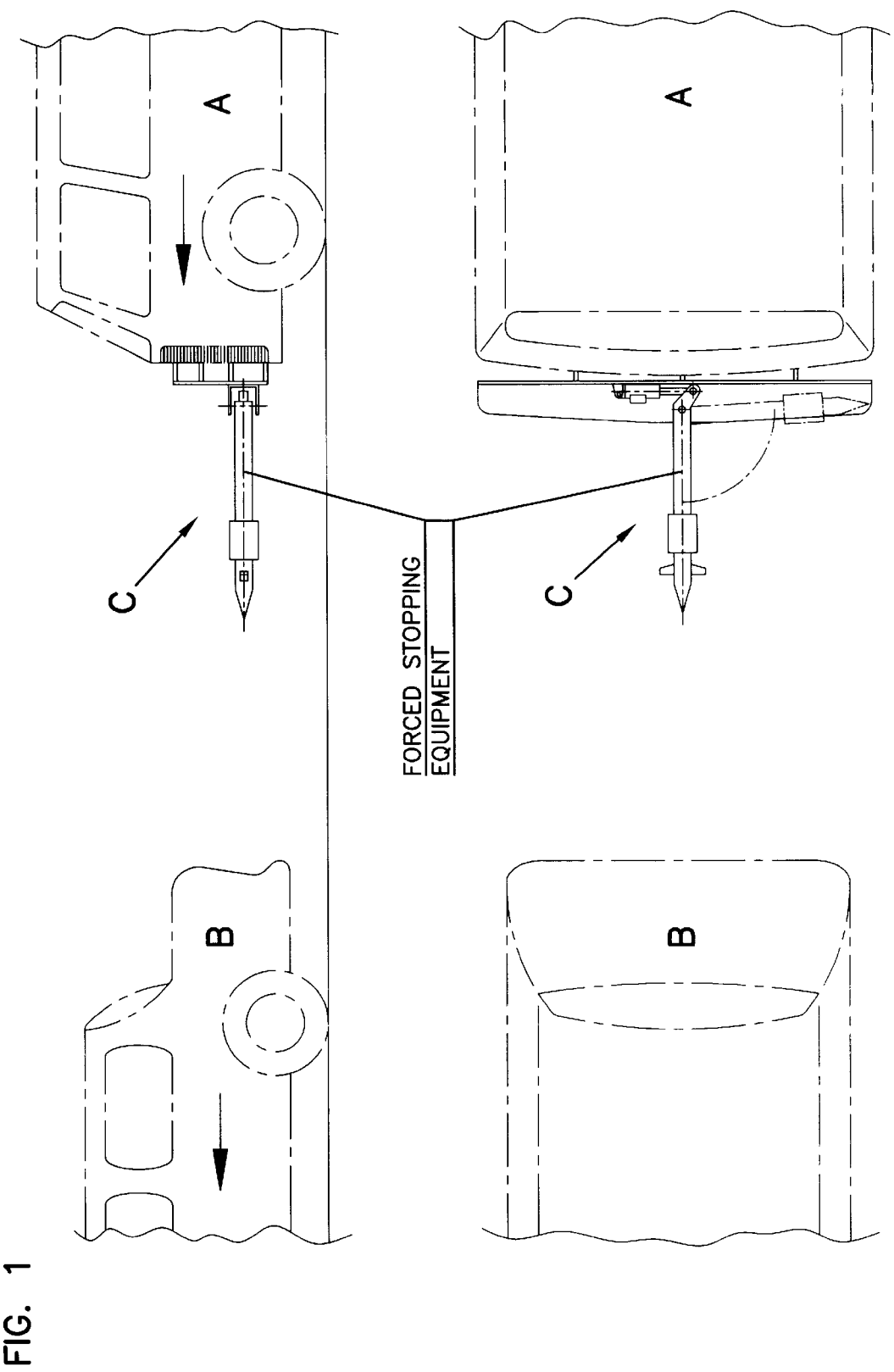
FIG. 1 illustrates the method according to the invention as viewed from the side and the top in the event of stopping.

FIG. 1 shows, as viewed from the side and the top, an approaching forced stopping where the fleeing vehicle, i.e., the vehicle being chased, is marked with B, the chasing vehicle, i.e., the vehicle carrying out the forced stopping is marked with A and the equipment according to the invention with C. In a case of forced stopping, the front end of vehicle A and equipment C are driven into the rear of vehicle B, in pursuit to stop B, so that the gripping means of equipment C engage the sheet metal structure of the rear of vehicle B, whereby vehicle B can be stopped with the aid of vehicle A. The operation of equipment C and the gripping means is controlled from the driver's compartment of vehicle A and this can be carried out by the driver of vehicle A or someone else. In one implementation of the method according to the invention, the gripping means penetrate the sheet metal structure of the car to be stopped and paralysing gas, for example, is conducted to the car to be stopped through equipment C. The method according to the invention is preferably implemented so that, in a possible event of danger, the engagement with vehicle B can be undone by, for example, detaching the gripping means from the rest of equipment C. A cartridge 14 or the like that releases gas can be arranged in the gripping means remaining in the fleeing vehicle, the cartridge going off when the gripping means are detached from equipment C.

Figure 2:
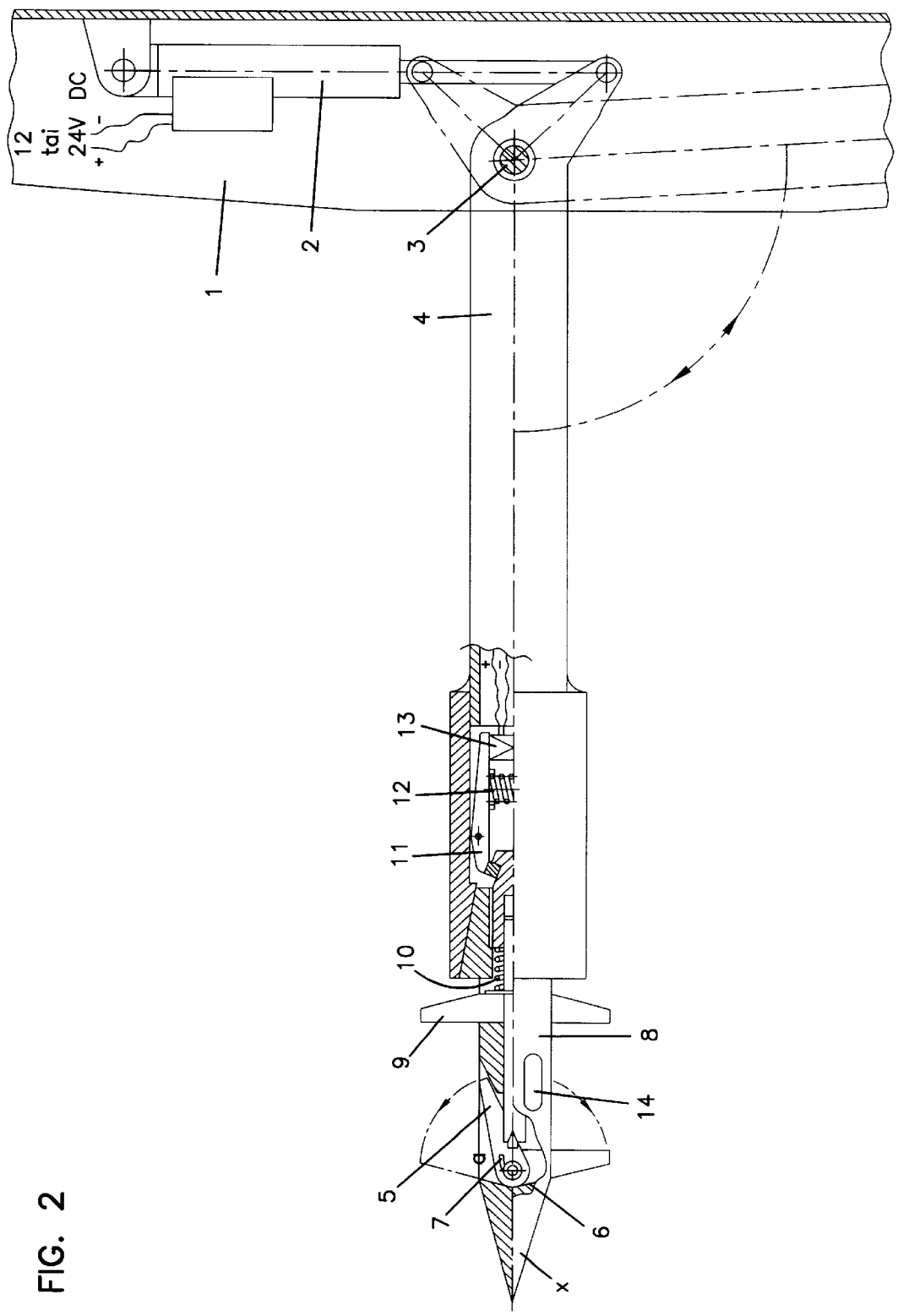
FIG. 2 is a top view of one embodiment of the equipment according to the invention on standby.

FIG. 2 shows one possible implementation of the forced stopping equipment attached to the front end of a vehicle. Fastening body 1 of the equipment is installed to the front end of the vehicle by a firm attachment. The installation can be stationary. In the rest position, body part 4 of the equipment is parallel to the bumper and it can be made ready for operation, i.e., turned into a standby position parallel to the car by, for example, using a switch placed in the driver's compartment, which controls the electric cylinder 2 serving as the turning actuator. Electric cylinder 2 is used to turn body part 4 about 90 degrees around swivel 3. The gripping means are attached to the end of body part 4. Penetrating means of tip part 8 included in them penetrates the rear metal sheet of the car that is being chased and the rear metal sheet collides with release bolt 9 after the penetration, the bolt moving when spring 10 is compressed and releasing gripping bolts 5. These turn around axis 6, because of spring 7, into the position marked by the line of dots and dashes. Now the rear metal sheet structure of the stopped car is between bolts 5 and 9 and a fixed contact between the cars is provided.

If the fixed contact between the cars must be undone for safety or other reasons, it is carried out from the driver's compartment of the chasing car by using an electric switch, for example, by exciting magnet 13, whereby its attractive force overcomes the hold power caused by spring 12, and leverage 11 turns and releases tip part 8 from body part 4 where there is a conical fitting, whereby the fixed contact between the cars is released and tip part 8 provided with the gripping means remains in the stopped car. This part can have a cartridge 14 accommodated therein, starting to release coloured smoke.

One possible implementation of the invention is described above in detail. However, it is clear to those skilled in the art that the gripping means, for example, can be implemented in many other ways than those that have been described above. The equipment according to the invention can also easily be provided with means to adjust the height of the gripping means. The actuator that turns the body part can be implemented by a hydraulic cylinder, for example. Also the control of the detachable attachment and the detachment of the gripping means can be implemented by various alternatives by those skilled in the art.

The invention can vary within the following claims.

What is claimed is:

1. A method for forced stopping of a second vehicle from a first vehicle wherein a front end of the first vehicle is provided with equipment for engaging metal sheet structures by penetrating through metal, said equipment being moveable between a rest position, wherein the equipment is generally parallel to a bumper of the first vehicle, and a standby position, wherein the equipment is generally parallel to the length of the first vehicle, the method comprising steps of:

moving the equipment from said rest position to said standby position, driving the front end of the first vehicle into the rear of the second vehicle so that the equipment on the front end of the first vehicle engages the sheet metal structure of the rear of the second vehicle;

stopping the first vehicle, whereby the second vehicle is stopped.

2. A method according to claim 1, wherein an operation of the equipment is controlled from a driver's compartment of the first vehicle.

3. A method according to claim 1, wherein the equipment is provided with a cartridge, whereby gas is conducted to the second vehicle through the equipment.

4. A method according to claim 1, the equipment is attached to the front end of the first vehicle in a detachable way and they can be controlled to be detached from the front end of the first vehicle.

5. Equipment for forced stopping of a second vehicle from a first vehicle, said equipment comprising:

a fastening part attached to a front end of the first vehicle;

a body part attached to the fastening part;

gripping means attached to the body part for engaging a sheet metal structure of the second vehicle by penetrating through the metal sheet at a rear of the second vehicle;

wherein the body part is moveable between a rest position, wherein the body part is generally parallel to a bumper of the first vehicle, and a standby position, wherein the body part is generally parallel to the length of the first vehicle.

6. Equipment according to claim 5, wherein the gripping means is attached to the body part in a detachable way.

7. Equipment according to claim 6, further comprising an actuator attached to the fastening part and to the body part, wherein said actuator can be used to turn the body part between a rest position and a standby position.

8. Equipment according to claim 7, further comprising a control means which can be used to control an operation for controlling the turning of the body part and the detaching of the gripping means of the equipment from a driver's compartment of the first vehicle.

9. Equipment according to claim 6, wherein the gripping means contains a cartridge for releasing gas when the gripping means are detached from the body part.

10. Equipment according to claim 6, further comprising a control means for controlling the detaching of the gripping means of the equipment from a driver's compartment of the vehicle.

11. Equipment according to claim 5, wherein the gripping means contain a penetrating means for penetrating a sheet metal structure and the equipment further contains a cartridge for conducting gas via the equipment through the penetrated sheet metal structure.

* * * * *